(12) United States Patent
Steciak, Jr.

(10) Patent No.: US 10,065,337 B1
(45) Date of Patent: Sep. 4, 2018

(54) SELF-POWERED TIMBER SLASHER

(71) Applicant: Spruce Creek Mechanical L.L.C., Dolgeville, NY (US)

(72) Inventor: John Steciak, Jr., Dolgeville, NY (US)

(73) Assignee: SPRUCE CREEK MECHANICAL L.L.C., Dolgeville, NY (US)

( * ) Notice: Subject to any disclaimer, the term of this patent is extended or adjusted under 35 U.S.C. 154(b) by 0 days.

(21) Appl. No.: 15/679,491

(22) Filed: Aug. 17, 2017

Related U.S. Application Data

(60) Provisional application No. 62/529,576, filed on Jul. 7, 2017.

(51) Int. Cl.
*B27B 5/10* (2006.01)
*B23D 47/10* (2006.01)

(52) U.S. Cl.
CPC ............... *B27B 5/10* (2013.01); *B23D 47/10* (2013.01)

(58) Field of Classification Search
CPC .................................. B27B 5/10; B23D 47/10
USPC ............................................... 30/379; 83/928
See application file for complete search history.

(56) References Cited

U.S. PATENT DOCUMENTS

| | | | | |
|---|---|---|---|---|
| 2,843,165 A * | 7/1958 | Sherron | ............... | A01G 23/091 144/208.5 |
| 5,408,907 A * | 4/1995 | Mains | .................. | B23D 45/028 144/379 |
| 6,014,996 A * | 1/2000 | Egging | ................. | A01G 23/067 123/352 |
| 6,269,719 B1 * | 8/2001 | Easton | ................. | B23D 45/126 83/54 |
| 7,610,738 B2 * | 11/2009 | Daly | ....................... | A01D 34/62 56/10.2 R |
| 7,984,735 B1 * | 7/2011 | Hayes | .................... | B23D 47/12 144/363 |
| 9,259,849 B2 * | 2/2016 | Hilsgen | ................ | B23D 45/027 |
| 2012/0298260 A1 * | 11/2012 | Kamps | ..................... | B27B 5/02 144/4.6 |
| 2013/0284317 A1 * | 10/2013 | Cudoc | ..................... | B27B 31/00 144/343 |
| 2014/0069554 A1 * | 3/2014 | Raszga | .................. | A01G 23/08 144/336 |
| 2015/0289456 A1 * | 10/2015 | Cudoc | ................. | A01G 23/097 144/429 |
| 2016/0039020 A1 * | 2/2016 | Hilton | .................. | A62C 99/009 83/169 |

* cited by examiner

*Primary Examiner* — Hwei C Payer

(57) ABSTRACT

Disclosed is a self-powered timber slasher. The self-powered timber slasher includes a trailer and a powered circle saw mounted on a first end of the trailer, wherein the powered circle saw is configured to cut timber. Further, the self-powered timber slasher an engine mounted on a second end of the trailer, wherein the engine is configured to generate power for operating the powered circle saw. Yet further, the self-powered timber slasher a wireless controller electrically coupled to the powered circle saw. The wireless controller is configured to control operation of the powered circle saw based on a command received over a wireless communication channel.

17 Claims, 10 Drawing Sheets

SELF-POWERED TIMBER SLASHER

The current application claims a priority to the U.S. Provisional Patent application Ser. No. 62/529,576 filed on Jul. 7, 2017.

FIELD OF THE INVENTION

The present invention relates generally to logging machinery. In particular, the present invention relates to a self-powered timber slasher.

BACKGROUND OF THE INVENTION

Timber slashers are machines that are used to cut long trees into shorter length logs. In general, timber slashers are either mounted on a trailer or they sit on the ground with its own frame and no tires. Since past few decades, the swing style timber slasher has proven to be a labor-saving attachment for the forest industry. Often, they have 48"-84" carbide tipped teeth that easily saw through muddy frozen trees. Therefore, many timber producers buy and depend on them to this day.

Many timber slashers rely on hydraulic power obtained from a log loader. The log loader is a separate machine which may be placed near a timber slasher. A log loader is a machine used to load and unload timber from log transportation vehicles and storage piles. The log loaders are often custom built with an extra dedicated hydraulic pump, valves, hoses, and other equipment required to power a saw of a timber slasher. The log loaders available in the market come with three options: no saw package, chain saw package, and circular saw package. If there is no saw, the machine is capable of loading logs only. With the separate chain saw option, operators are able to power a chain saw slasher, but they are slow, and dull easily and often. The circular saw is the fastest way to cut trees into pre-chosen shorter logs or pulp length pieces. Therefore, users often purchase log loaders with a circular saw package, so that it can power a timber slasher.

However, many timber producers today are having a hard time running their businesses due to adverse weather and economic conditions. They are still using older, outdated log loaders that have been paid for, and get the job done. But most of these outdated log loaders are not equipped to run a chain saw slasher or a top of the line productive circular saw attachment. It is very costly to add a chain saw hydraulic system to a "bare" log loader. Further, it is expensive and almost impossible to add a circular saw package to a machine after it has left the manufacturing factory. The swivel center port in the heart of a bare loader may have 5 ports. But a chain saw center swivel may have 7-8 ports with regular pump pressures and gallons per minute. Further, circular saws may need 11-13 ports at 65 gallons per minute to operate.

Therefore, a circular saw package on a log loader built at the factory is also available. These machines operate at higher pressures and may reach up to 75 gallons per minute. The flow from a dedicated pump through a center swivel through valves out the hoses to a hydraulic motor that rotates the circular saw. However, when users operate these machines, they take precious power from the log loader, thereby restricting its use for other duties. Therefore, during a cut, an operator is unable to do anything with the log loader until the circular saw exits the cut and goes back into the stand-by mode. Further, considerable heat buildup is created when making high volume (such as 100 gallons) of hydraulic oil travel around in a circuit. Yet further, the saw blade never stops rotating, it keeps running, waiting for the operator to swing it into the next cut. It uses momentum to power through the timber.

However, it is expensive to add the circular saw package at a factory. A lot of extra valves, electrical circuits, pumps, hoses, coolers, and electronics is needed to be installed in an already tightly packed area on the machine. Also, when such a machine experiences a catastrophic failure (such as in a pump or valve), the contaminated oil may be routed out to and back from the separate slasher, causing that machine to be infected (such as by metal in the oil).

Therefore, a timber slasher needs to be connected to only that log loader that is properly equipped from the factory to safely and efficiently operate the circular saw unit. When the log loader is down for repairs, the slasher can't be used as it needs the power derived from the loader to get it operating. Most manufacturers today offer the circular saw package on a large truck or a trailer mounted log loader. Some manufacturers provide a saw package built into a crawler mounted log loader. These machines are very versatile in the woods as they can be moved instantaneously during any part of the day. Further, they don't need to be exited down into a truck. However, in sub-zero weather, these machines may freeze up mechanically and physically in mud and snow. Also, trailer mounted rigs have to be moved by a skidder or another tractor even if it needs to go just a small distance (such as, 10 feet). Also note, a saw package installed on an excavator is not available anywhere. Some contractors may use their machine in the summer to build roads, load gravel, or for other general excavating. In the winter, when logging is advantageous, they convert their excavator into a log loader by removing the dirt bucket and installing a log grapple. Accordingly, one machine can be used 12 months a year. This is advantageous as they need just one machine instead of having two machines, which requires less investment, maintenance and repairs. However, such excavators cannot be used for cutting timber as they do not have a built-in saw package to power a slasher.

Further, some existing log loaders do not have ball valves installed in the bottom of the tank. Therefore, if a hose is blown away, the operator will lose all their hydraulic oil on the ground. While the pump is detached and being repaired, a diesel vacuum unit needs to be hooked up to hold the oil in the tank. It is expensive to carry a diesel-powered vacuum unit to maintain oil in the tank in case of a blown hose. Typically, only dealer's service trucks have them. Moreover, in the existing machines, debris or human error may cause the hydraulic lines to get damaged or get broken, causing oil spills and down time.

Accordingly, there is a need for an apparatus for logging which may allow an operator to upgrade a bare log loader with a productive circular saw. Further, the apparatus may not rely on power from a log loader, which allows for safer and more efficient operation. Yet further, a versatile apparatus is required that may operate with any excavator or log handling device to enable safe and efficient production of logs, pulp and firewood.

It is much safer to have one loader/slasher operator cutting of trees than two or three employees on the ground with rulers and chainsaws cutting by hand.

Many injuries and deaths have occurred by a loader operator who has his vision blocked by the boom when he rotates his machine.

SUMMARY OF THE INVENTION

This summary is provided to introduce a selection of concepts in a simplified form that are further described below in the Detailed Description. This summary is not intended to identify key features or essential features of the claimed subject matter. Nor is this summary intended to be used to limit the claimed subject matter's scope.

Disclosed is a self-powered timber slasher. The self-powered timber slasher includes a trailer and a powered circular saw mounted on a first end of the trailer, wherein the powered circular saw is configured to cut timber. Further, the self-powered timber slasher has an engine mounted on a second end of the trailer, wherein the engine is configured to generate power for operating the powered circular saw. Yet further, the self-powered timber slasher has a wireless controller electrically coupled to the powered circular saw. The wireless controller is configured to control operation of the powered circular saw based on a command received over a wireless communication channel.

According to some aspects, the present disclosure provides an apparatus for logging (a timber slasher), which includes a separate self-powered unit which allows for safer and more efficient operation. The apparatus includes a powered circular saw, a self-powered unit, hydraulics and all electronics required to operate the circular saw. The apparatus may be used with existing bare log loaders. No expensive upgrades are required on the existing bare log loaders. Any loader or excavator (new or old), can be used to load trees and remove cut logs from its deck because the disclosed apparatus is a totally separate, self-powered unit. Further, no hoses or electronics need to be hooked up.

According to some aspects, the present disclosure allows for a cordless remote control of the disclosed timber slasher from the cab of a log loader (or an excavator). A separate small remote control may be strapped to any joystick, lever, or dashboard in the log loader (or an excavator). Therefore, no electrical or hydraulic connections are required between the log loader (or excavator), and the disclosed timber slasher.

Further, if a contractor has a major failure with a log loader (such as with a trailer, tracks, or wheels), they may pull up to this damaged unit and carry on production with a spare bare loader (or excavator), while the damaged one is being repaired. Further, if there is a catastrophic breakdown on one machine, then it does not have an adverse effect on the other machine. The heat buildup is also low because of separate hydraulic systems.

The disclosed timber slasher includes ball valves to save the hydraulic oil if a hose fails. Further, the disclosed timber slasher includes tracks; therefore, it is very stable and it does not suffer from the problem of flat tires.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAIL DESCRIPTIONS OF THE INVENTION

Figure 1:
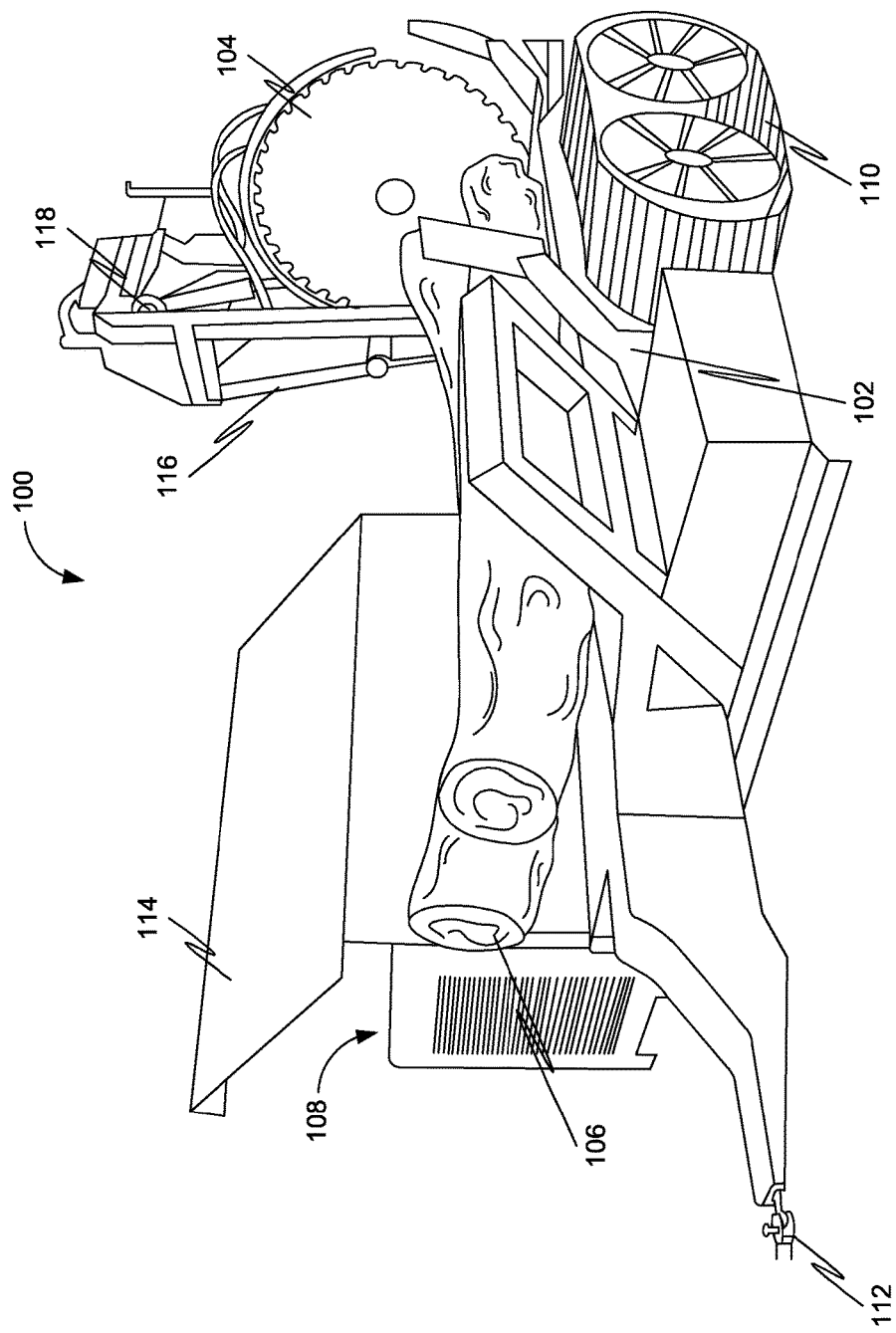
FIG. 1 illustrates a front right side perspective view of a self-powered timber slasher, in accordance with some embodiments.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of provisioning timber slashers, embodiments of the present disclosure are not limited to use only in this context.

Please refer to FIGS. 1-10, the present disclosure provides a self-powered timber slasher 100. FIG. 1 illustrates a front right side perspective view of the self-powered timber slasher 100, in accordance with some embodiments. The self-powered timber slasher 100 includes a trailer 102. Further, the self-powered timber slasher 100 includes a powered circular saw 104 mounted on a first end (a rear end) of the trailer 102. The powered circular saw 104 is configured to cut timber (such as logs 106). Further, the blade of the powered circular saw 104 may have any suitable size, such as any size between 24"-84" or even larger.

The trailer 102 may include one or both of a track and a wheel. As shown, the trailer 102 includes a track 110. The track 110 may be made of one or both of rubber and steel. During operation, even seasoned operators may accidentally bump the top of the trailer 102 and roll it over on its side. During such accidents, the saw blade may hit the ground and cause severe damage to itself and the surrounding area. Therefore, the track 110 may be designed to be heavy and sturdy to eliminate the risk of tipping over of the self-powered timber slasher 100.

Further, the trailer 102 may include a frame configured to station the self-powered timber slasher 100 on the ground. For example, the self-powered timber slasher 100 may be stationed on the ground when it is used to cut timber. This may provide more stability to the trailer 102.

Figure 2:
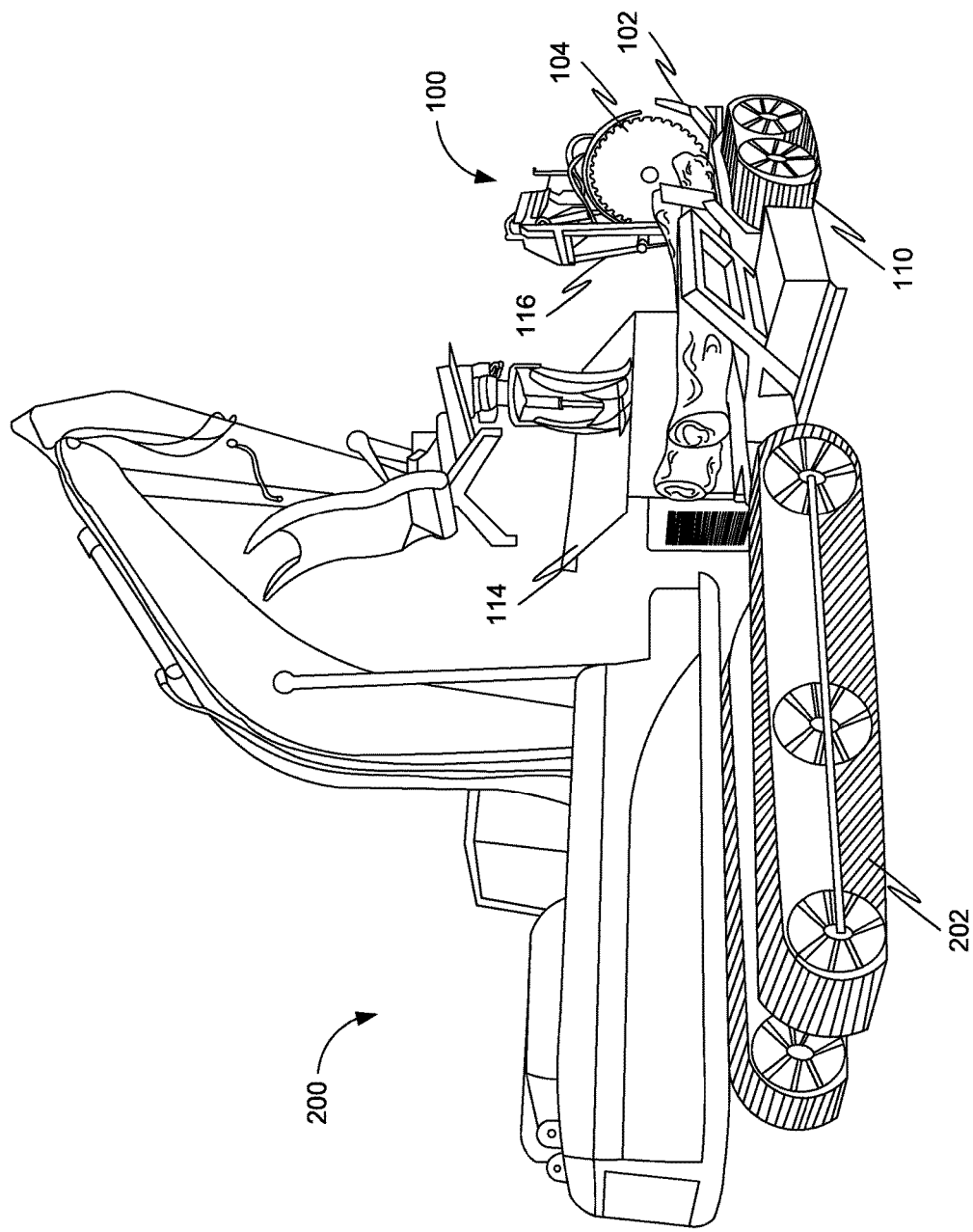
FIG. 2 illustrates a front right side perspective view of the self-powered timber slasher along with a vehicle, in accordance with some embodiments.
Figure 3:
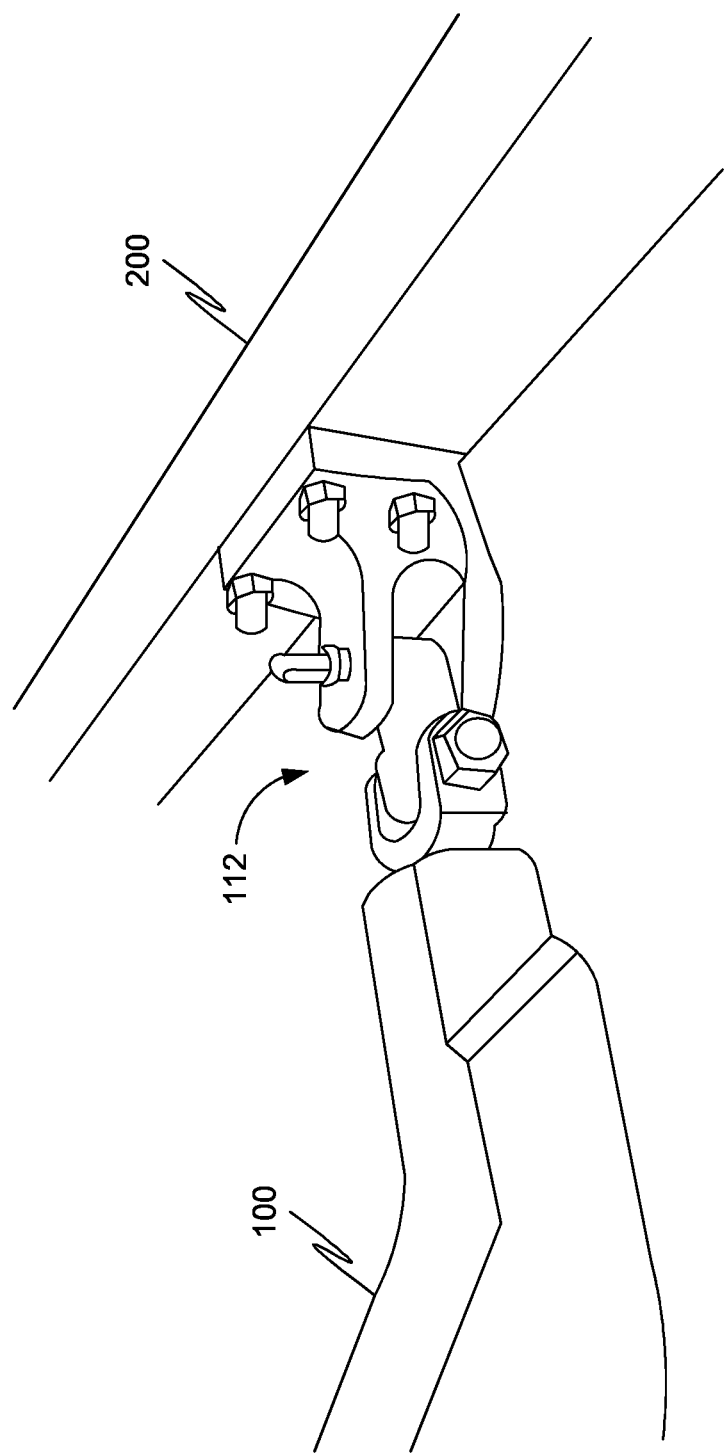
FIG. 3 illustrates a perspective view of a coupling mechanism between the self-powered timber slasher and the vehicle, in accordance with some embodiments.
Figure 4:
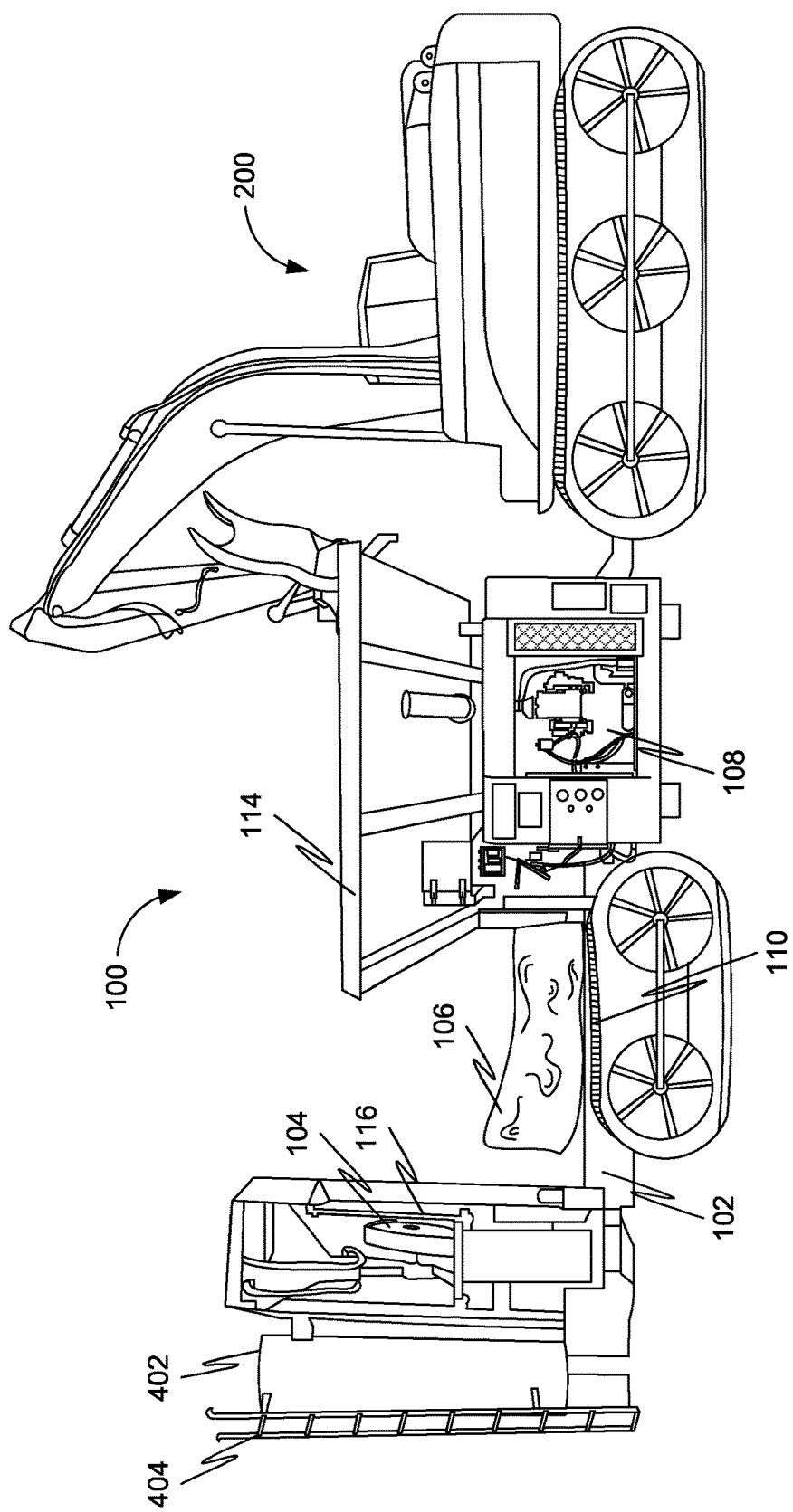
FIG. 4 illustrates a left side view of the self-powered timber slasher along with the vehicle, in accordance with some embodiments.
Figure 5:
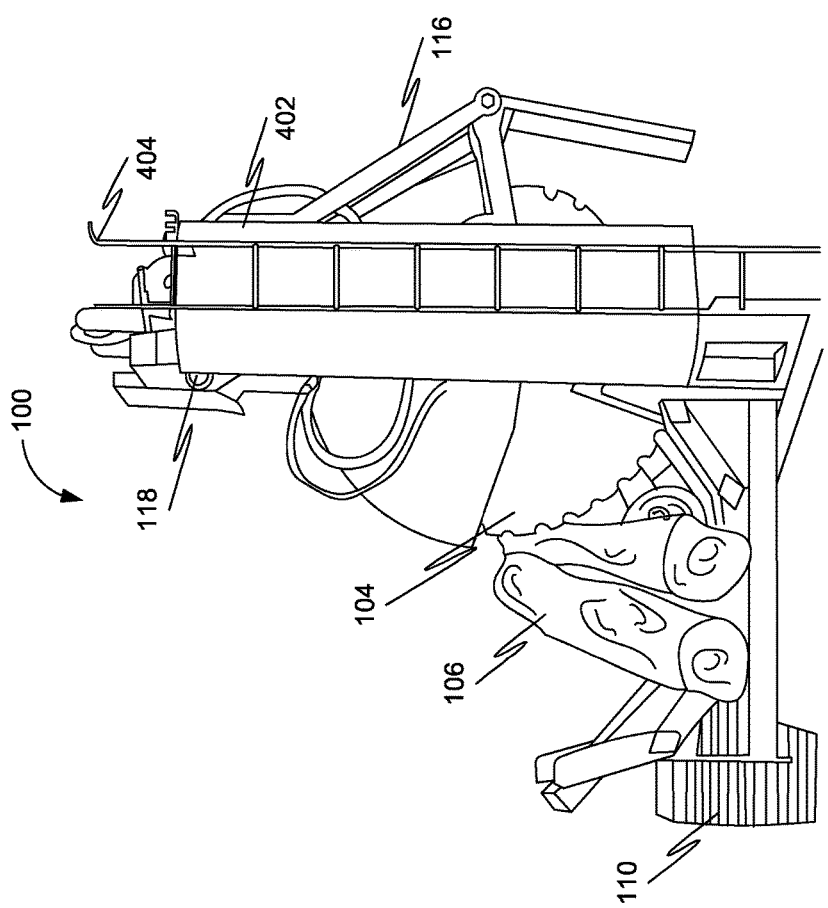
FIG. 5 illustrates a rear perspective view of the self-powered timber slasher, in accordance with some embodiments.

Further, the self-powered timber slasher 100 may include a coupling mechanism 112 configured to attach the self-powered timber slasher 100 to a vehicle 200 as shown in FIG. 2. The coupling mechanism 112 may include a pivotal joint configured to allow pivotal motion between the self-powered timber slasher 100 and the vehicle 200 as shown in FIG. 3. FIG. 4 illustrates a left side view of the self-powered timber slasher 100 along with the vehicle 200. FIG. 5 illustrates a rear perspective view of the self-powered timber slasher 100. The vehicle 200 may facilitate mobility of the self-powered timber slasher 100. The vehicle 200 may include one or both of a track and a wheel. As shown, the vehicle has tracks 202. The vehicle 200 may be a log loader, such as a crawler log loader. Alternatively, the vehicle may be an excavator comprising a log grapple configured to be removably attachable to the excavator.

Figure 6:
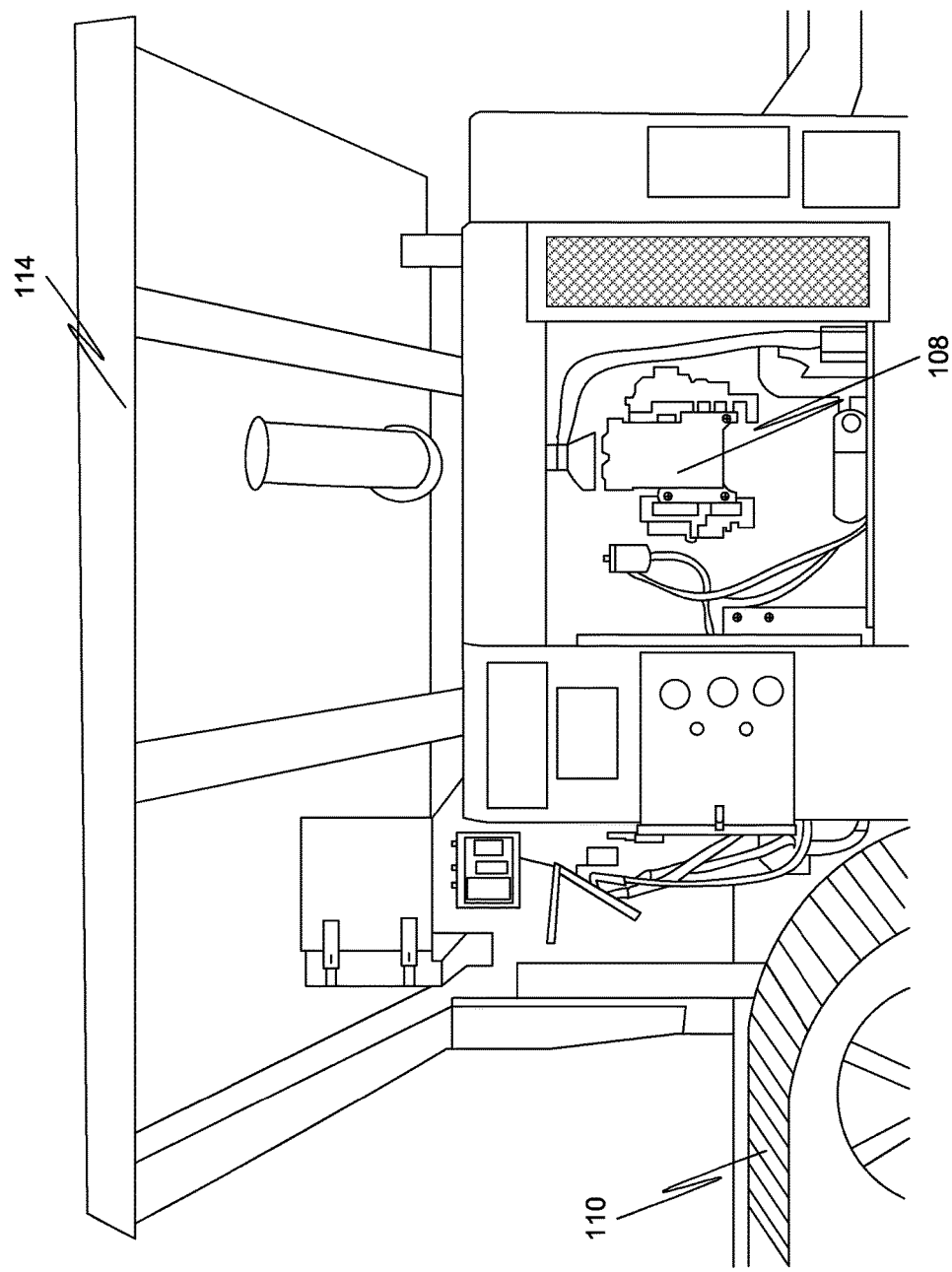
FIG. 6 illustrates a side view of an engine of the self-powered timber slasher, in accordance with some embodiments.

Yet further, the self-powered timber slasher 100 includes an engine 108 mounted near a second end (a front end) of the trailer 102 as shown in FIG. 4. FIG. 6 illustrates a side view of the engine 108, in accordance with some embodiments. The engine 108 may be mounted low, with easy access from all sides, even the log side with a removable protective side shield 114. The engine 108 is configured to generate power for operating the powered circular saw 104. The engine 108 may be a fuel powered engine. For example, the engine 108 may be a 125-horsepower diesel engine. Further, the powered circular saw 104 may be rotationally coupled to the engine 108.

Moreover, the self-powered timber slasher 100 includes a wireless controller (not shown) electrically coupled to the powered circular saw 104. The wireless controller is configured to control operation of the powered circular saw 104 based on a command received over a wireless communication channel. The wireless controller may be further configured to receive a capacity indicator associated with the vehicle 200, wherein the wireless controller may be further configured to control operation of the powered circular saw 104 based on the capacity indicator. Further, the vehicle 200 may include a portable operator device configured to wirelessly transmit the command to the wireless controller based on an input from an operator. The portable operator device may be removably attached to a vehicle controller device configured to control operation of the vehicle 200. For example, the portable operator device may be strapped to any joystick, lever, or dashboard of the vehicle 200.

The self-powered timber slasher 100 may further include a hydraulic tank 402 configured to store a hydraulic fluid. For example, the hydraulic tank 402 may have a capacity of 125-gallon. Also, the hydraulic fluid may be a general hydraulic oil, a wear-resistant hydraulic oil and a flame retardant hydraulic oil. Further, the self-powered timber slasher 100 may include a hydraulic motor coupled to the powered circular saw 104. The hydraulic motor may be configured to impart a rotational motion to the powered circular saw 104 based on a flow of the hydraulic fluid. The hydraulic motor may be in fluid connection with the hydraulic tank 402. Yet further, the self-powered timber slasher 100 may include a hydraulic pump configured to transport the hydraulic fluid between the hydraulic tank and the hydraulic motor. The hydraulic pump may be in fluid connection with each of the hydraulic tank and the hydraulic motor. The hydraulic pump may obtain power from the engine 108. For example, a Kawasaki™ excavator style hydraulic pump may be used that allows the engine 108 to easily start in cold weather with no load on it, until a valve is actuated to operate a function after the engine warm-up. This pump is capable of pushing 65 gallons a minute from the hydraulic tank 402 through the valves and hydraulic motors and then back to hydraulic tank 402.

Further, a ladder 404 may be installed next to hydraulic tank 402, so the hydraulic tank 402 can be accessed easily by an operator. The hydraulic tank 402 may also have a built-in safety strainer. The hydraulic tank 402 may be built out of stainless steel for longevity. Various fuel lines may be routed in tubes for protection. Further, separate hydraulic suction lines and filters may be used to keep contaminants out of the hydraulic fluid. The high-pressure lines may be routed from the hydraulic pump to valves to bulk head fittings in the frame of the self-powered timber slasher 100. From there, they are routed internally to be protected from logs or anything else that may hit them. For example, the high-pressure lines may be routed internally through 8×8 tubes. Similarly, incoming low-pressure suction lines may also be routed for protection internally inside 6×6 tubes.

Yet further, the self-powered timber slasher 100 may include a swing arm 116 configured to swing about a pivot 118, wherein the powered circular saw 104 is mounted on the swing arm 116. Further, the self-powered timber slasher 100 may include a hydraulic actuator coupled to the swing arm 116. The hydraulic actuator may be configured to impart a pivotal motion to the swing arm 116 based on a flow of the hydraulic fluid, wherein the hydraulic motor is in fluid connection with the hydraulic tank 402. The self-powered timber slasher 100 may also include a gear pump configured to transport the hydraulic fluid between the hydraulic tank and the hydraulic actuator, wherein the hydraulic pump is in fluid connection with each of the hydraulic tank and the hydraulic actuator.

Moreover, the self-powered timber slasher 100 may include one or more valves configured to control a flow of the hydraulic fluid to the hydraulic motor. The one or more valves may include an electric solenoid configured to control the flow of the hydraulic fluid based on an electrical signal receivable from the wireless controller. The electric solenoid may be electrically coupled to the wireless controller. Further, the self-powered timber slasher 100 may include another valve configured to control a flow of the hydraulic fluid to the hydraulic actuator, wherein the valve may include an electric solenoid configured to control the flow of the hydraulic fluid based on an electrical signal receivable from the wireless controller, wherein the electric solenoid may be electrically coupled to the wireless controller. For example, Galtech™ valves may be used as they have manual hand controls and built in electric solenoids.

Yet further, the self-powered timber slasher 100 may include one or more ball valves disposed proximate to a bottom of the hydraulic tank 402, wherein one or more ball valves may be configured to shut-off flow of the hydraulic fluid from the hydraulic tank 402. The one or more ball valves may be shut off in the event of a repair or malfunction, so that no hydraulic fluid is lost on the ground.

Figure 7:
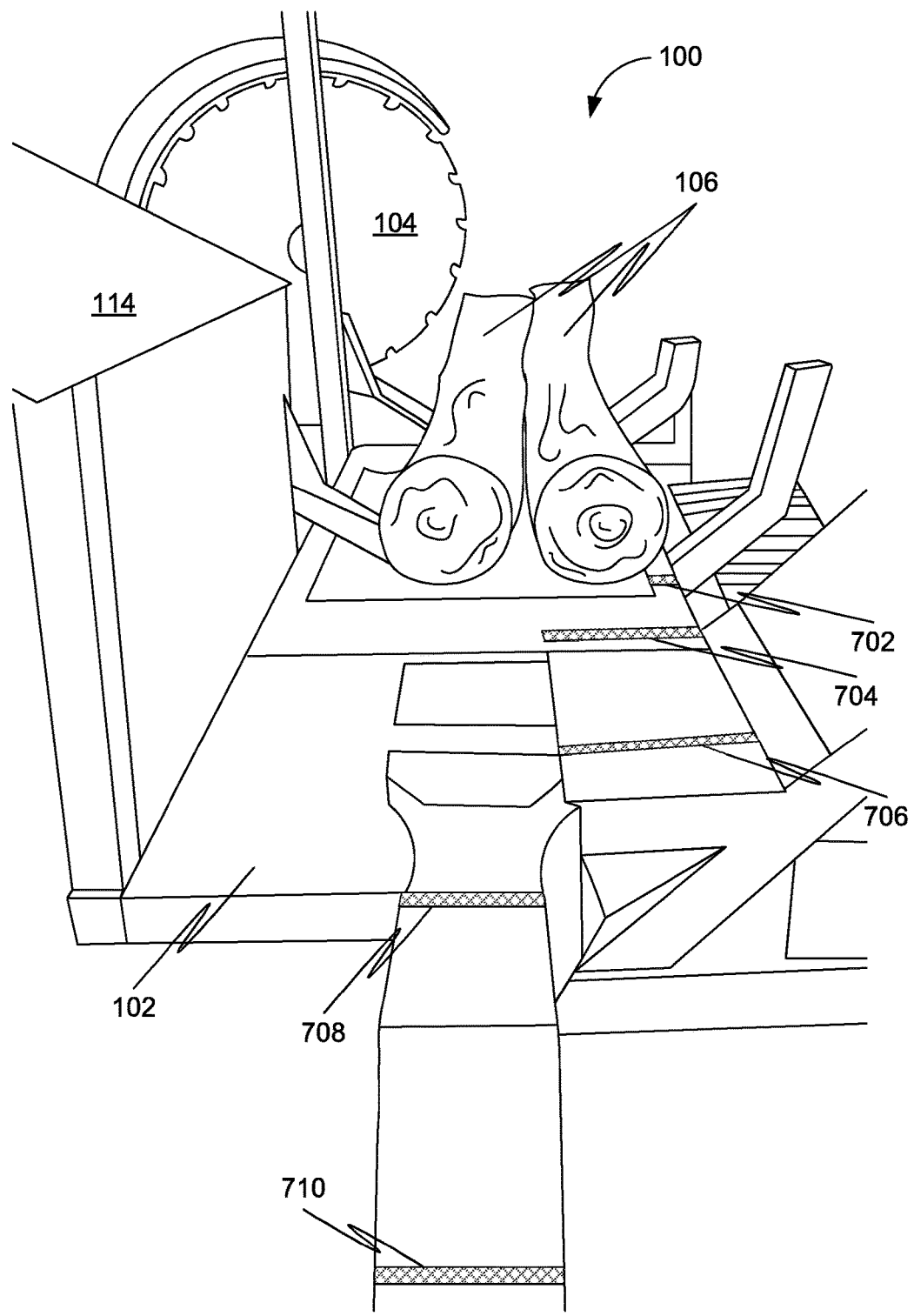
FIG. 7 illustrates a front perspective view of the self-powered timber slasher, in accordance with some embodiments.

Several guides may be marked on the self-powered timber slasher 100 to indicate the length of the log being cut. This may help the operator to accurately cut the logs. FIG. 7 shows guides 702, 704, 706, 708 and 710 marked on the deck of the self-powered timber slasher 100. The guides 702, 704, 706, 708 and 710 may correspond to for 8', 10', 12', 14', 16' lengths respectively.

Figure 8:
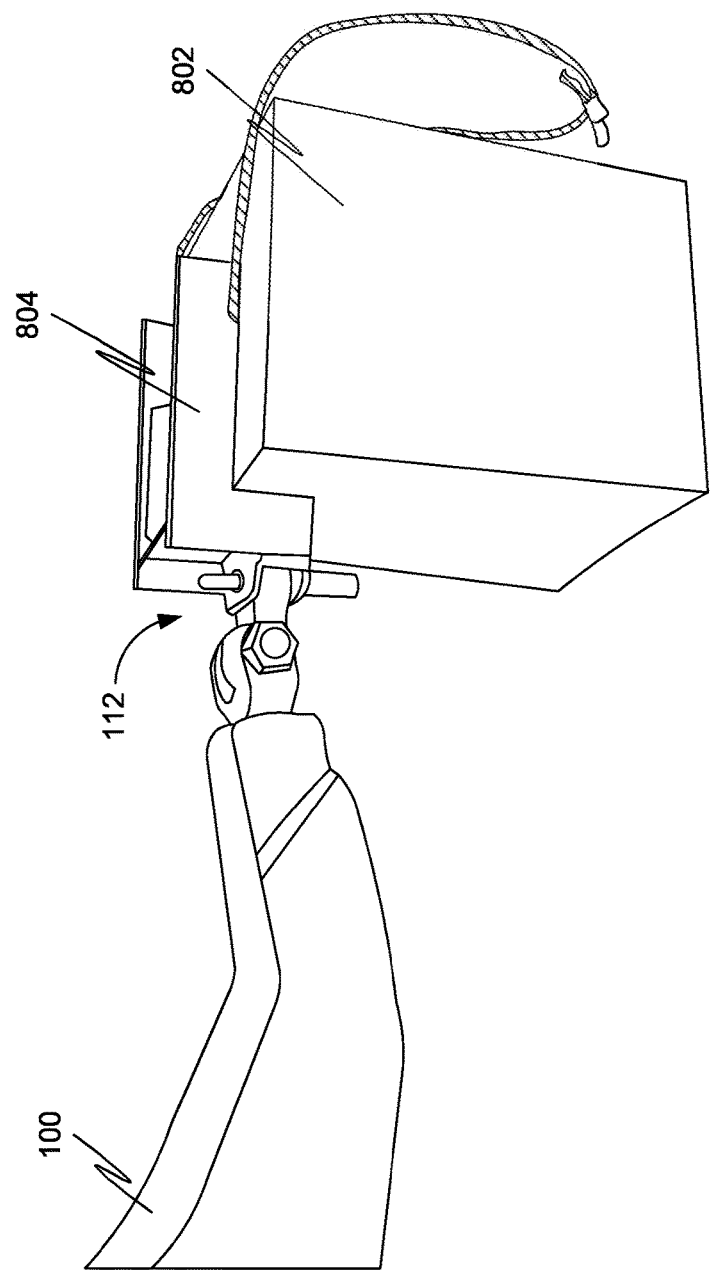
FIG. 8 illustrates a perspective view of the self-powered timber slasher pinned to a concrete deadman hitch, in accordance with some embodiments.
Figure 9:
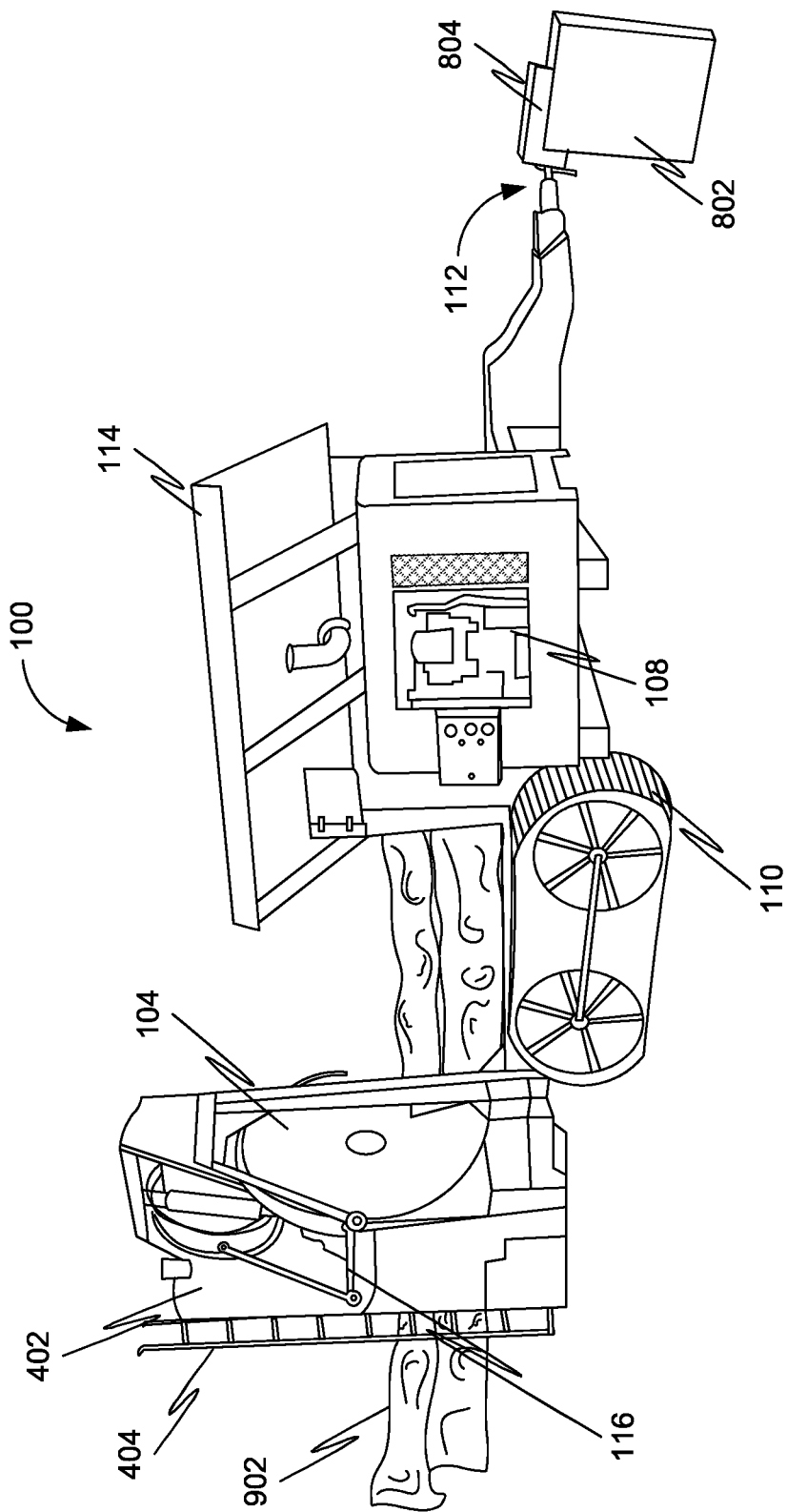
FIG. 9 illustrates the self-powered timber slasher pinned to the concrete deadman hitch, while it is cutting long logs, in accordance with some embodiments.
Figure 10:
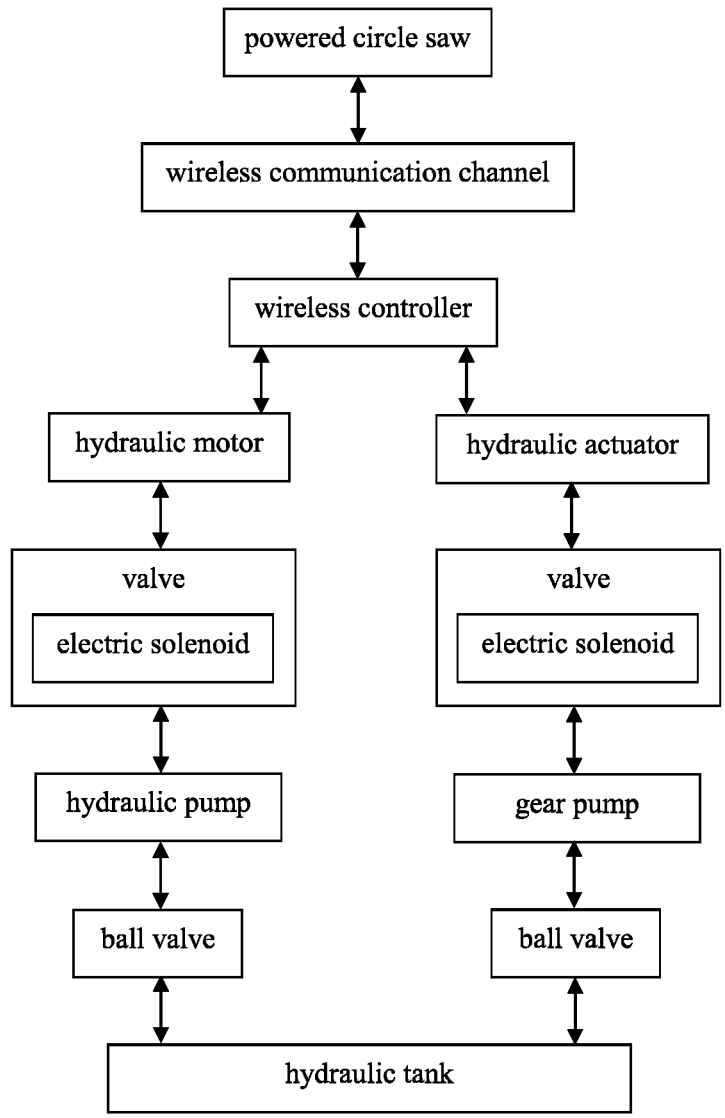
FIG. 10 illustrates a diagram of connections between some elements of the self-powered timber slasher, in accordance with some embodiments.

However, when trees are to be cut into logs longer than 20 feet, the self-powered timber slasher 100 maybe set sideways and pinned to a concrete deadman hitch 802 as shown in FIG. 8. Accordingly, the self-powered timber slasher 100 may also include a coupler 804 configured to pin the self-powered timber slasher 100 to the concrete deadman hitch 802 via the coupling mechanism 112. FIG. 9 shows the self-powered timber slasher 100 pinned to the concrete deadman hitch 802, while it is cutting long logs 902.

According to further embodiments, the self-powered timber slasher 100 may include one or more cameras to capture at least one or more portions of a tree that needs to be cut at a desired length. When using the deadman hitch 802, the self-powered timber slasher 100 may be 20-30 feet away from the log handling device. The operator does not need to strain his eyes to check on the proper length of the log to be cut. He may just glance on a camera monitor in the cab for the correct length and avoid a miscut. Further, the self-powered timber slasher 100 may include a wireless transmitter coupled to the at least one camera, wherein the wireless transmitter is configured to transmit images captured by the one or more cameras.

According to further embodiments, the self-powered timber slasher 100 may include a proximity sensor configured to detect a proximity of the vehicle 200 to the self-powered timber slasher 100. The wireless controller is electrically coupled to the engine 108, wherein the wireless controller is further configured to control operation of the engine 108 based on the proximity.

DETAIL DESCRIPTIONS OF THE EMBODIMENTS

A self-powered timber slasher may be provided. The self-powered timber slasher may include a trailer. Further, the self-powered timber slasher may include a powered circular saw mounted on a first end of the trailer. Further, the powered circular saw may be configured to cut timber. Further, the self-powered timber slasher may include an engine mounted on a second end of the trailer. Further, the engine may be configured to generate power for operating the powered circular saw. Further, the self-powered timber slasher may include a wireless controller electrically coupled to the powered circular saw. Further, the wireless controller may be configured to control operation of the powered circular saw based on a command received over a wireless communication channel.

In some embodiments, the self-powered timber slasher may further include at least one mobility device attached to the trailer. Further, the at least one mobility device facilitates mobility of the self-powered timber slasher.

In some embodiments, the at least one mobility device may include one or more of a track and a wheel.

In some embodiments, the self-powered timber slasher may further include a frame configured to station the self-powered timber slasher on the ground.

In some embodiments, the self-powered timber slasher may be mounted on a trailer with rubber tires or even steel wheels.

In some embodiments, the engine may include a fuel powered engine.

In some embodiments, the powered circular saw may be rotationally coupled to the engine.

In some embodiments, the self-powered timber slasher may further include a hydraulic tank configured to store a hydraulic fluid and a hydraulic motor coupled to the powered circular saw. Further, the hydraulic motor may be configured to impart a rotational motion to the powered circular saw based on a flow of the hydraulic fluid. Further, the hydraulic motor may be in fluid connection with the hydraulic tank. Further, a hydraulic pump may be configured to transport the hydraulic fluid between the hydraulic tank and the hydraulic motor. Further, the hydraulic pump may be in fluid connection with each of the hydraulic tank and the hydraulic motor.

In some embodiments, the self-powered timber slasher may further include a swing arm configured to swing about a pivot. Further, the powered circular saw may be mounted on the swing arm and a hydraulic actuator may be coupled to the swing arm. Further, the hydraulic actuator may be configured to impart a pivotal motion to the swing arm based on a flow of the hydraulic fluid. Further, the hydraulic motor may be in fluid connection with the hydraulic tank. Further, a gear pump may be configured to transport the hydraulic fluid between the hydraulic tank and the hydraulic actuator. Further, the hydraulic pump may be in fluid connection with each of the hydraulic tank and the hydraulic actuator.

In some embodiments, the self-powered timber slasher may further include at least one valve configured to control a flow of the hydraulic fluid to the hydraulic motor. Further, the at least one valve may include an electric solenoid configured to control the flow of the hydraulic fluid based on an electrical signal receivable from the wireless controller. Further, the electric solenoid may be electrically coupled to the wireless controller.

In some embodiments, the self-powered timber slasher may further include a valve configured to control a flow of the hydraulic fluid to the hydraulic actuator. Further, the valve may include an electric solenoid configured to control the flow of the hydraulic fluid based on an electrical signal receivable from the wireless controller. Further, the electric solenoid may be electrically coupled to the wireless controller.

In some embodiments, the self-powered timber slasher may further include at least one ball valve disposed proximate to a bottom of the hydraulic tank. Further, the at least one ball valve may be configured to shut-off flow of the hydraulic fluid from the hydraulic tank.

In some embodiments, the self-powered timber slasher may further include a coupling mechanism configured to attach the self-powered timber slasher to a vehicle.

In some embodiments, the coupling mechanism may include a pivotal joint configured to allow pivotal motion between the self-powered timber slasher and the vehicle.

In some embodiments, the self-powered timber slasher may further include a coupler configured to pin the self-powered timber slasher to a concrete deadman hitch.

In some embodiments, the vehicle may be a log loader. In some embodiments, the log loader may be a crawler log loader. In some embodiments, the vehicle may be an excavator including a log grapple configured to be removably attachable to the excavator.

In some embodiments, the vehicle may include a portable operator device configured to wirelessly transmit the command to the wireless controller based on an input from an operator.

In some embodiments, the portable operator device may be removably attached to a vehicle controller device configured to control operation of the vehicle.

In some embodiments, the self-powered timber slasher may further include at least one camera to capture at least one portion of the self-powered timber slasher. Further, a wireless transmitter may be coupled to the at least one camera. Further, the wireless transmitter may be configured to transmit images captured by the at least one camera.

In some embodiments, the self-powered timber slasher may further include a proximity sensor configured to detect a proximity of the vehicle to the self-powered timber slasher. Further, the wireless controller may be electrically coupled to the engine. Further, the wireless controller may be further configured to control operation of the engine based on the proximity.

In some embodiments, the wireless controller may be further configured to receive a capacity indicator associated with the vehicle. Further, the wireless controller may be further configured to control operation of the powered circular saw based on the capacity indicator.

Although the invention has been explained in relation to its preferred embodiment, it is to be understood that many other possible modifications and variations can be made without departing from the spirit and scope of the invention.

I claim:

1. A self-powered timber slasher comprising:
   a trailer;
   a powered circular saw mounted on a first end of the trailer, the powered circular saw being configured to cut timber;
   a wireless controller electrically coupled to the powered circular saw, the wireless controller is being configured to control operation of the powered circular saw based on a command received over a wireless communication channel;
   a hydraulic tank configured to store a hydraulic fluid;
   a hydraulic motor coupled to the powered circular saw, the hydraulic motor being configured to impart a rotational motion to the powered circular saw based on a flow of the hydraulic fluid, the hydraulic motor being in fluid connection with the hydraulic tank; and
   a hydraulic pump configured to transport the hydraulic fluid between the hydraulic tank and the hydraulic motor, the hydraulic pump being in fluid connection with each of the hydraulic tank and the hydraulic motor.

2. The self-powered timber slasher of claim 1 further comprising at least one mobility device attached to the trailer, wherein the at least one mobility device facilitates mobility of the self-powered timber slasher.

3. The self-powered timber slasher of claim 2, wherein the at least one mobility device comprises at least one of a track and a wheel.

4. The self-powered timber slasher of claim 1 further comprising a frame configured to station the self-powered timber slasher on ground.

5. The self-powered timber slasher of claim 1 further comprising:
   a swing arm configured to swing about a pivot, the powered circular saw being mounted on the swing arm;
   a hydraulic actuator coupled to the swing arm, the hydraulic actuator being configured to impart a pivotal motion to the swing arm based on the flow of the hydraulic fluid, the hydraulic actuator is in fluid connection with the hydraulic tank; and a gear pump configured to transport the hydraulic fluid between the hydraulic tank and the hydraulic actuator, the hydraulic pump being in fluid connection with each of the hydraulic tank and the hydraulic actuator.

6. The self-powered timber slasher of claim 5 further comprising a valve configured to control the flow of the hydraulic fluid to the hydraulic actuator, the valve comprising an electric solenoid configured to control the flow of the hydraulic fluid based on an electrical signal receivable from the wireless controller, electric solenoid being electrically coupled to the wireless controller.

7. The self-powered timber slasher of claim 1 further comprising at least one valve configured to control the flow of the hydraulic fluid to the hydraulic motor, the at least one valve comprising an electric solenoid configured to control the flow of the hydraulic fluid based on an electrical signal receivable from the wireless controller, the electric solenoid being electrically coupled to the wireless controller.

8. The self-powered timber slasher of claim 1 further comprising at least one ball valve disposed proximate to a bottom of the hydraulic tank, the at least one ball valve is-being configured to shut-off flow of the hydraulic fluid from the hydraulic tank.

9. The self-powered timber slasher of claim 1 further comprising a coupling mechanism configured to attach the self-powered timber slasher to a vehicle.

10. The self-powered timber slasher of claim 9, wherein the coupling mechanism comprises a pivotal joint configured to allow pivotal motion between the self-powered timber slasher and the vehicle.

11. The self-powered timber slasher of claim 9 further comprising a coupler configured to pin the self-powered timber slasher to a concrete deadman hitch.

12. The self-powered timber slasher of claim 9, wherein the vehicle is a log loader.

13. The self-powered timber slasher of claim 12, wherein the log loader is a crawler log loader.

14. The self-powered timber slasher of claim of claim 9, wherein the vehicle is an excavator comprising a log grapple configured to be removably attachable to the excavator.

15. The self-powered timber slasher of claim 9, wherein the vehicle comprises a portable operator device configured to wirelessly transmit the command to the wireless controller based on an input from an operator.

16. The self-powered timber slasher of claim 15, wherein the portable operator device is removably attached to a vehicle controller device configured to control operation of the vehicle.

17. The self-powered timber slasher of claim 1 further comprising:
at least one camera to capture at least one portion of the self-powered timber slasher; and
a wireless transmitter coupled to the at least one camera, wherein the wireless transmitter is configured to transmit images captured by the at least one camera.

* * * * *